G. SCHUMACHER.
ALARM INDICATOR FOR BOILING PURPOSES.
APPLICATION FILED NOV. 22, 1909.
996,804.
Patented July 4, 1911.
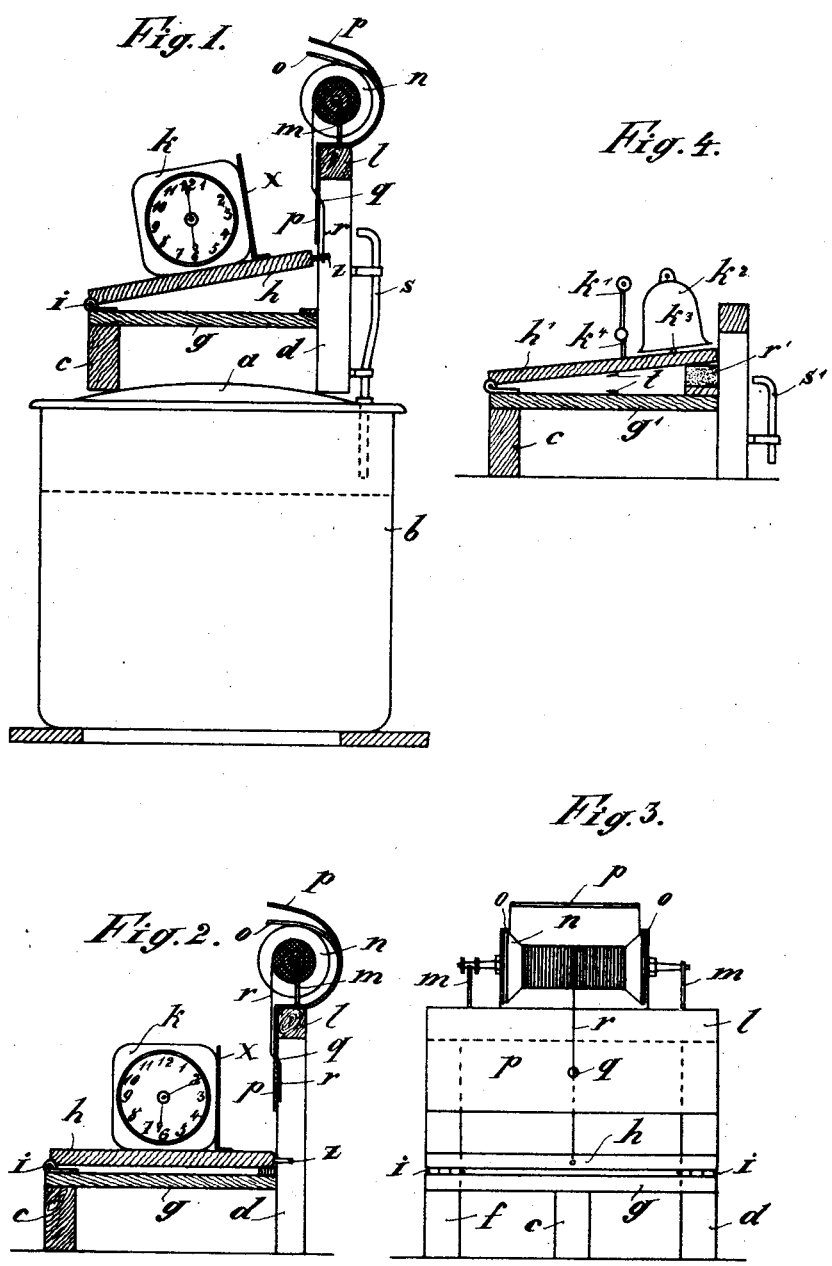

UNITED STATES PATENT OFFICE.

GEORG SCHUMACHER, OF WERMELSKIRCHEN, GERMANY.

ALARM-INDICATOR FOR BOILING PURPOSES.

996,804. Specification of Letters Patent. Patented July 4, 1911.

Application filed November 22, 1909. Serial No. 529,425.

*To all whom it may concern:*

Be it known that I, GEORG SCHUMACHER, a subject of the Emperor of Germany, residing at 20 Friedrichstrasse, Wermelskirchen, in the Empire of Germany, sculptor, have invented certain new and useful Improvements in Alarm-Indicators for Boiling Purposes, of which the following is a specification.

In many cases, such as for instance in boiling albuminous substances, medicines and the like it is of the greatest importance for the chemical preparation of the substance or for the preservation or production of a particular taste or its digestibility, to boil the substance for a given time which should be maintained with the greatest precision between comparatively narrow limits. Thus chemical experiments have shown for example that the animal milk which serves as infants' food should be allowed to boil only for a short time, which must be precisely observed if on the one hand any bacteria that may be contained in the milk are to be safely destroyed without on the other hand detrimentally affecting the digestive properties of the milk beyond the degree necessitated by its boiling for the former purpose.

The present invention has for its object to determine and to automatically indicate the period during which the boiling should be maintained from the moment the boiling begins, and it consists in a device which is so influenced directly or indirectly by the steam developed during the boiling operation as to give an alarm either at the beginning or at the end of the boiling period required for a particular substance.

Two forms of a device according to this invention are shown, by way of example, in the accompanying drawings in which:

Figure 1 is a lateral view of one form of the device in position before the boiling commences. Fig. 2 shows a longitudinal section of the same device but in its position during boiling. Fig. 3 is a front view of the device, and Fig. 4 illustrates a second form of the device, in longitudinal section.

The device is placed, for instance, by means of a support $c\ d\ f$, loosely on the cover or lid $a$ of an ordinary cooking pot or vessel. The support carries a stationary bottom $g$ connected to which by a hinge $i$ or the like is a movable plate or bottom $h$ which is thus capable of assuming an inclined position. Placed upon the plate $h$ is a pendulum alarm clock $k$. In order to prevent the latter from being displaced and at the same time to protect it against the steam rising from the cooking vessel, a shield or screening plate $x$ is provided as shown. The legs $d$ and $f$ of the support extend in an upward direction so as to form two standards connected at the top by a cross bar $l$. Secured to the upper ends of the standards are strong wire posts or arms $m$, the free ends of which form the bearings for a roller $n$. In order to prevent the roller $n$ from rotating except under the influence of a substantial force, a resilient arm or arms $o$ are used to act as a brake against the flanges of the roller. To this end the gripping parts of the arms may be roughened. In the construction shown these arms form part of a protecting metal screen $p$ partly surrounding the roller. The lower part of the screen $p$ has an opening $q$ for the passage of the end of a cord wound upon the roller to the rear of the screen where it is attached to a pin $z$ or the like, which is secured to or forms part of the movable plate $h$ in order to hold the latter in an upwardly inclined position.

The force exerted by the arms $o$ upon the roller must of course be great enough to counteract rotation of the roller under the influence of the weighted plate $h$. Opposite to the end of the cord $r$ in the rear of the screen $p$ and at some distance therefrom, is the opening of a pipe or conduit $s$. The latter projects through the lid $a$ of the vessel $b$ without, however, reaching the level of the substance or liquid to be boiled.

For the operation of the device the bottom plate $h$ is first raised to an inclined position, as shown in Fig. 1, and the clock is adjusted to the exact time during which boiling is to take place. The vessel is then placed over the fire and during the time which will elapse before the contents, say milk, begin to boil, the clock remains in the inclined position (Fig. 1), in which the vertically hanging pendulum is out of its middle order and therefore cannot move itself. In the named position the clock work is at a standstill. Upon the milk beginning to boil, the hot vapors escaping through the pipe $s$ strike against the cord $r$. If the latter is made of artificial silk, blotting paper material or the like, which is capable of being dissolved by moisture, it will become soaked and softened by the steam projected against it, and will thus lose its tensile strength and will break. The inclined plate $h$ is thereby freed and assumes a horizontal position and the clock, owing to the jerk produced by the fall of the plate $h$, will be set in motion. As soon as the boiling period for which the clock has been set, expires, the alarm is rendered operative, reminding the attendant that the vessel must be removed from the fire.

Fig. 4 represents a modified construction of the device and is distinguished from the latter mainly by the fact that in the place of the clock $k$ a simple alarm bell $k^2$ is used, while the plate $h^1$ is held inclined by a bar or block of sugar $r^1$. The alarm consists of a bell $k^2$ resting on a pin $k^3$ secured to the plate $h^1$. In front of the bell and suspended from a pin or support $k^4$ is a hammer $k^1$ which strikes against the bell $k^2$ during the movement or descent of the plate $h^1$. In the first place this device serves to indicate the moment at which the liquid or substance begins to boil. It will therefore be used with particular advantage whenever the boiling period required should be of particularly short duration, i. e., where a pendulum alarm clock would not prove sufficiently sensitive. After adjusting the plate $h^1$ in its inclined position with the aid of a block or bar of sugar $r^1$, the device is ready for use. As soon as boiling commences, the steam rises through the pipe $s^1$ to the sugar $r^1$, whereby the latter is caused to melt and the plate $h^1$ drops to its horizontal position.

By the force of the fall the hammer $k^1$ is caused to strike the bell $k^2$, thus giving an alarm to indicate that boiling as commenced.

The device may also be used for indicating the time during which the boiling should take place. Attached to each frame or plate $g^1$, $h^1$, is a contact piece $t$ connected with the poles of an appropriate electric source. Arranged in the circuit is a signaling device or alarm which is rendered operative by the closing of the contacts $t$. So long as the sugar block $r^1$ remains solid, i. e. before boiling commences, the two contacts $t$ are separated from each other. Their contact does not take place until boiling begins and the plate $h^1$ drops to the horizontal position.

As already mentioned, the device may be used for determining the boiling of any liquid or substance. It may with great advantage be used when boiling preserves, &c. All that is necessary is to adjust the alarm to the required period. In large cooking establishments the various alarm devices may be adjusted for the boiling of different foods or substances for a determined time, as will be easily understood.

I claim:

1. An alarm indicator for boiling purposes comprising an alarm device, a movable carrier for same and means for supporting said carrier, said means being decomposable by the moisture of the steam produced by the boiling substance.

2. An alarm indicator for boiling purposes comprising an alarm device, a movable carrier for same, a material decomposable by steam for holding said carrier in such position that the alarm device is inoperative, and means for projecting steam upon said material to release the carrier and bring the alarm device into operative position, substantially as described.

3. An alarm indicator for boiling purposes comprising an alarm device, a hinged carrier for same and means for supporting said carrier, said means being decomposable by the moisture of the steam produced by the boiling substance.

4. An alarm indicator for boiling purposes comprising an alarm device, a movable carrier for same, means for supporting said carrier, said means being decomposable by the moisture of the steam produced by the boiling substance, and electric contacts substantially as set forth.

5. An alarm indicator for boiling purposes comprising an alarm device, a movable carrier for same, a material decomposable by steam for holding said carrier in such position that the alarm device is inoperative, means for projecting steam upon said material to release the carrier and bring the alarm device into operative position, and electric contacts adapted to be brought into contact when the carrier is released, substantially as set forth.

6. An alarm indicator for boiling purposes comprising an alarm device, a hinged carrier for same, a thread of material which is readily decomposed or deformed by steam holding said carrier in its set position and means for projecting steam upon said material to release the carrier and bring the alarm device into operative position, substantially as set forth.

7. An alarm indicator for boiling purposes, comprising an alarm device, a hinged carrier for same, a roller mounted above said carrier, a cord of material which is readily decomposed or deformed by steam wound upon said roller and secured to the carrier to hold it in its set position and means for projecting steam upon said cord to release the carrier and bring the alarm device into operating position substantially as set forth.

In testimony whereof I have signed my name to this specification in the presence of two subscribing witnesses.

GEORG SCHUMACHER. [L. S.]

Witnesses:
OTTO KÖNIG,
CHAS. J. WRIGHT.